April 30, 1957     O. R. FELCUS     2,790,604
HOT AIR HEATING APPARATUS
Filed May 17, 1954     2 Sheets-Sheet 1
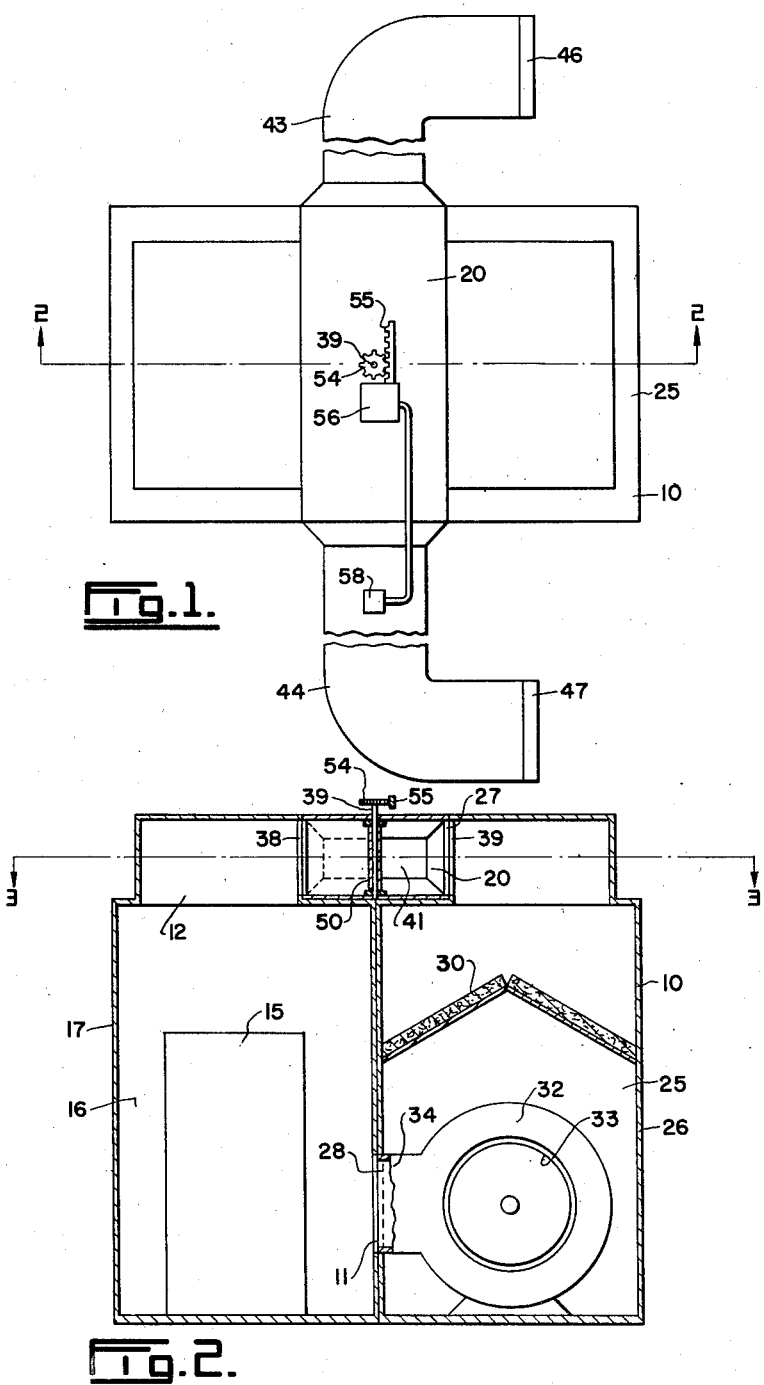
INVENTOR
OTIS ROBERT FELCUS
BY
Fetherstonhaugh & Co.
ATTORNEYS

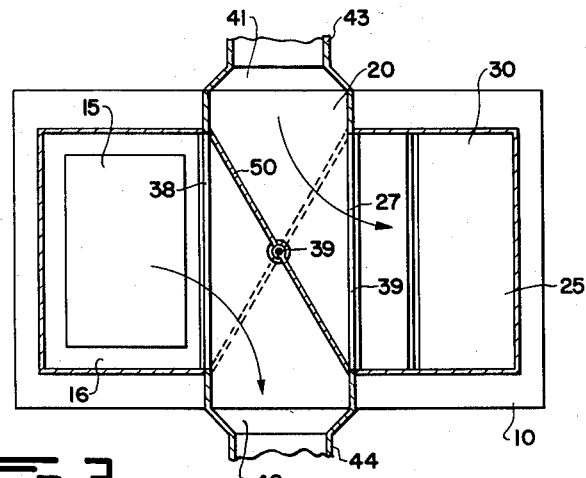
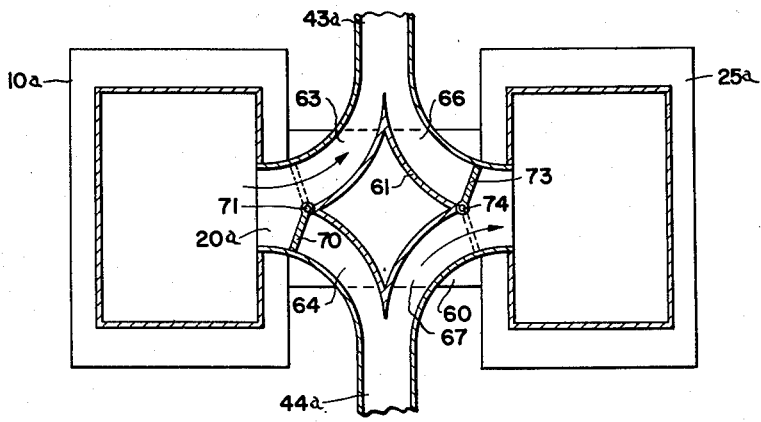

United States Patent Office 2,790,604
Patented Apr. 30, 1957

2,790,604

HOT AIR HEATING APPARATUS

Otis R. Felcus, Dawson Creek, British Columbia, Canada

Application May 17, 1954, Serial No. 430,353

13 Claims. (Cl. 237—2)

This invention relates to improvements in hot air heating apparatus.

The main object of this invention is the provision of heating apparatus which sucks air in from one part of a building while at the same time discharging hot air into another part thereof, and including apparatus for reversing this action. Thus, cold air is alternately sucked out of each part of the building and hot air alternately directed thereinto. This eliminates the necessity of cold air return ducts since the same duct is used for both hot and cold air to each part of the building. The register through which the hot air is discharged into a room in the prior heating apparatus is now also used as a cold air outlet. There may be one or more registers or combined hot air outlets and cold air inlets, in each section of the building being heated.

This invention saves labour and material during the installation of the equipment, and when the apparatus is used for heating a home, it results in fewer pipes in the basement.

The heating apparatus according to this invention includes a heating unit having a cold air inlet and a hot air outlet, two pipes or ducts connected to both the hot air outlet and the cold air inlet, and means for alternately bringing the inlet into communication with one pipe and the outlet with the other pipe and vice versa. During one time the heating unit is sucking air from one pipe and directing hot air through the other, and then it sucks cold air through the latter and directs hot air through the former. The alternating means is usually in the form of one or more baffles which may be controlled by a thermostat in one of the pipes. As hot air is directed through that pipe, when the temperature reaches a predetermined point, the baffle means is operated to direct hot air through the other pipe, at which time cold air is sucked in through the first pipe. When the temperature drops to a predetermined point, the baffle means is again operated to reverse the air flow.

Two examples of this invention are illustrated in the accompanying drawings, in which, Figure 1 is a plan view of the hot air heating apparatus, Figure 2 is a vertical section through the apparatus taken substantially on the line 2—2 of Figure 1, Figure 3 is a horizontal section taken on the line 3—3 of Figure 2, and, Figure 4 is a view similar to Figure 3, illustrating an alternative form of the invention.

Referring to Figures 1 to 3 of the drawings, 10 is a heating unit having a cold air inlet 11 and a hot air outlet 12. This unit includes a combustion chamber 15 of any desired design and fired in any suitable manner, located within a heating chamber 16 formed by a casing 17 surrounding and spaced from the combustion chamber.

The hot air outlet 12 is at the top of the heating unit and preferably communicates with a plenum chamber 20. This plenum chamber may be arranged so that the cold air outlet of the heating unit communicates directly therewith, or a pipe may extend between them. However, it is preferable to provide a return unit 25 in the form of a casing 26 which opens into the plenum chamber at its top at 27, and has an outlet 28 near the bottom thereof registering with the inlet 11 of the heating unit, as clearly shown in Figure 2. In the unit 25 is an air filter arrangement 30 of any desired design located centrally thereof through which all air must pass moving from its top inlet 27 to the bottom outlet 28. A blower 32 is located within the casing 26 at the bottom thereof, said blower having an air inlet 33 and a discharge outlet 34 extending to the return unit outlet 28.

The plenum chamber 20 is closed excepting for lateral openings 38 and 39 which communicate respectively with the heating unit outlet 12 and the return unit inlet 27, and openings 41 and 42 in its opposite ends which communicate with pipes or ducts 43 and 44, respectively. Each of these pipes may extend to a plurality of registers. In this example, pipe 43 extends to a register or outlet 46, while pipe 44 extends to another register or outlet 47.

In this form of the invention, a baffle plate 50 in the plenum chamber 20 is fixedly mounted approximately midway between its ends on a vertical shaft 39 mounted in suitable bearings and projecting upwardly through the top of said chamber. The shaft is arranged centrally of the chamber and the baffle is adapted to be moved into two diagonal positions relative to the latter. The baffle is of such length and the openings 38 and 39 are so designed and positioned that when the baffle is in one position, the position shown in full lines in Figure 3, one end is positioned at one side of the opening 38 and its opposite end at the other side of opening 39. This brings heating unit outlet 12 and the opening 38 into communication with pipe 44, and the return unit inlet 27 and opening 39 into communication with pipe 43. When the baffle is moved to its other position, shown in dotted lines in Figure 3, this setting is reversed, that is, outlet 12 and opening 38 are in communication with pipe 43, and inlet 27 and opening 39 are in communication with pipe 44.

The baffle 50 may be moved between its two positions by any suitable equipment. For example, a pinion 54 may be mounted on the upper end of shaft 39 outside the plenum chamber, said pinion meshing with a rack 55 which is reciprocated by an operator 56. As devices of this nature are well known in the heating art, it is not necessary to describe the operation and construction of this operator herein. The operator, in turn, is controlled by a thermostat 58 having its temperature element projecting into one of the pipes, in this example, pipe 44. This thermostat and operator set-up is such that when the temperature in pipe 44 rises to a predetermined point, rack 55 is moved in one direction, and when the temperature drops to another predetermined point, the rack is moved in the opposite direction.

When this heating apparatus is in operation, at one moment hot air is blown from the heating unit 10 through pipe 44 and register 47 and cold air is sucked into the heating unit through register 46, pipe 43 and the return unit 25. When the temperature in pipe 43 drops to a predetermined point, this is reversed and hot air is blown out through pipe 43 and register 46, and cold air is sucked in through register 47, pipe 44 and the return unit. When the temperature in pipe 43 rises to a predetermined point, the setting is again reversed.

This change of setting is obtained by swinging the baffle 50 back and forth between its two positions in the plenum chamber 20. When in the full line position shown in Figure 3, the hot air from the heating unit passes through its outlet 12, the plenum chamber opening 38 into pipe 44. At the same time, cold air is sucked from pipe 43 through the plenum chamber opening 39, the return unit inlet 27, through said unit and into the bottom of the heating unit through the registering openings 11 and 28. When the baffle is moved to the dotted line position in Figure 3, the action is reversed, that is, the hot air from the outlet 12 passes through the plenum chamber opening 38 into pipe 43, while cold air passes through said chamber and the return unit into the bottom of the heating unit.

Figure 4 illustrates an alternative form of the invention. In this example, the heating unit 10a discharges into a plenum chamber 20a, while a return unit 25a also communicates at its top with said chamber. The outlet of the return unit is connected by a pipe 60 to the cold air inlet of the heating unit.

The plenum chamber has a diamond-shaped wall 61 positioned centrally thereof dividing it into four passages. Passages 63 and 64 extend from the heating unit outlet to pipes 43a and 44a respectively, while passages 66 and 67 extend from the return unit inlet respectively to said pipes. A baffle 70 fixedly mounted on a vertical shaft 71, is positioned alternately to close off the passages 63 and 64 from the hot air outlet, and another baffle 73 fixedly mounted on a vertical shaft 74 is arranged alternately to cut off the passages 66 and 67 from the return unit inlet. Any desired means may be employed for moving the two baffles between their two settings such as that disclosed in connection with the form of the invention illustrated in Figures 1 to 3. The baffles are arranged so that when baffle 70 cuts off passage 64, baffle 73 cuts off passage 66, and when the first baffle cuts off passage 63, the second baffle cuts off passage 67.

The operation of the apparatus of Figure 4 is essentially the same as that of the other form of the invention. With the setting shown in Figure 4, hot air is being directed through passage 63 to pipe 43a, and cold air is being drawn in from pipe 44a through passage 67. When the baffles are reversed, hot air is directed through passage 64 to pipe 44a, and cold air is drawn in from pipe 43a through passage 66.

What I claim as my invention is:

1. In hot air apparatus for heating two sections of a building, a heating unit having a cold air inlet and a hot air outlet, two pipes connected at adjacent ends to both the hot air outlet and the cold air inlet, the opposite end of one pipe being connected to one building section and the opposite end of the other pipe being connected to the other building section, and means for alternately bringing the inlet into communication with one pipe and the outlet with the other pipe and vice versa, thereby alternately directing hot air into and drawing cold air out of each building section through the same pipe.

2. In hot air apparatus for heating two sections of a building, a heating unit having a cold air inlet and a hot air outlet, two pipes connected at adjacent ends to both the hot air outlet and the cold air inlet, the opposite end of one pipe being connected to one building section and the opposite end of the other pipe being connected to the other building section, and baffle means for alternately bringing the inlet into communication with one pipe and the outlet with the other pipe and vice versa, and means for operating the baffle means alternately to change the setting thereof, thereby alternately directing hot air into and drawing cold air out of each building section through the same pipe.

3. Hot air heating apparatus as claimed in claim 2 including a blower for moving air from the heating unit inlet to the outlet thereof.

4. In hot air apparatus for heating two sections of a building, a heating unit having a cold air inlet and a hot air outlet, two pipes connected at adjacent ends to both the hot air outlet and the cold air inlet, the opposite end of one pipe being connected to one building section and the opposite end of the other pipe being connected to the other building section, baffle means for alternately bringing the inlet into communication with one pipe and the outlet with the other pipe and vice versa, means for operating the baffle means alternately to change the setting thereof, and a thermostat on one of the pipes and connected to the operating means for causing the latter to change the setting of the baffle means in accordance with the temperature in said pipe, thereby alternately directing hot air into and drawing cold air out of each building section through the same pipe.

5. In hot air apparatus for heating two sections of a building, a heating unit having a cold air inlet and a hot air outlet, a return unit having an inlet and an outlet, means connecting the outlet of the return unit to the inlet of the heating unit, two pipes extending at adjacent ends to both the heating unit outlet and the return unit inlet, the opposite end of one pipe being connected to one building section and the opposite end of the other pipe being connected to the other building section, and means for alternately bringing the heating unit outlet into communication with one pipe and the return unit inlet with the other pipe and vice versa, thereby alternately directing hot air into and drawing cold air out of each building section through the same pipe.

6. Hot air heating apparatus as claimed in claim 5 including a blower for moving air through the return unit outlet into the heating unit inlet.

7. Hot air heating apparatus as claimed in claim 5 including a thermostat in one of the pipes operatively connected to the alternating means for controlling the latter in accordance with the temperature in said pipe.

8. In hot air apparatus for heating two sections of a building, a heating unit having a cold air inlet and a hot air outlet, a return unit having an inlet and an outlet, means connecting the outlet of the return unit to the inlet of the heating unit, two pipes extending at adjacent ends to both the heating unit oulet and the return unit inlet, the opposite end of one pipe being connected to one building section and the opposite end of the other pipe being connected to the other building section, and baffle means for alternately bringing the heating unit outlet into communication with one pipe and the return unit inlet with the other pipe and vice versa, thereby alternately directing hot air into and drawing cold air out of each building section through the same pipe.

9. Hot air heating apparatus as claimed in claim 8 including a motor-driven mechanism connected to the baffle means for alternately changing the position of said means, and a thermostat in one of the pipes connected to the motor-driven mechanism for causing the latter to change the position of the baffle means in accordance with the temperature in said pipe.

10. In hot air apparatus for heating two sections of a building, a heating unit having a cold air inlet and a hot air outlet, a return unit having an inlet and an outlet, means connecting the outlet of the return unit to the inlet of the heating unit, a common plenum chamber connected to both the heating unit outlet and the return unit inlet, two opposed outlets from said chamber, a pipe connecting one outlet to one building section, another pipe connecting the other outlet to the other building section, a baffle in the chamber movable alternately into two positions, one position bringing the heating unit outlet into communication with one chamber outlet and the return inlet with the other chamber outlet, and the other position reversing this setting, and means connected to the baffle for alternately moving it into the two positions thereof, thereby alternately directing hot air into and drawing cold air out of each building section through the same pipe.

11. In hot air apparatus for heating two sections of a building, a heating unit having a cold air inlet and a hot air outlet, a return unit having an inlet and an outlet, means connecting the outlet of the return unit to the inlet of the heating unit, a common plenum chamber connected to both the heating unit outlet and the return unit inlet, two opposed outlets from said chamber, a pipe connecting one outlet to one building section, another pipe connecting the other outlet to the other building section, a baffle in the chamber movable alternately into two positions, one position bringing the heating unit outlet into communication with one chamber outlet and the return inlet with the other chamber outlet, and the other position reversing this setting, a blower for moving air through the return unit outlet into the heating unit inlet, and means connected to the baffle for alternately moving it into the two positions thereof, thereby alternately directing hot air into and drawing cold air out of each building section through the same pipe.

12. Hot air heating apparatus as claimed in claim 10 in which the means for moving the baffle is a motor-driven mechanism.

13. Hot air heating apparatus as claimed in claim 12 including a thermostat positioned at one of the plenum chamber outlets connected to the motor-driven mechanism for causing the latter to move the baffle in accordance with the temperature at said outlet.

References Cited in the file of this patent

UNITED STATES PATENTS

| | | |
|---|---|---|
| 2,557,605 | Kohut | June 19, 1951 |

FOREIGN PATENTS

| | | |
|---|---|---|
| 359,151 | Great Britain | Oct. 22, 1931 |
| 444,848 | Germany | May 31, 1927 |